United States Patent [19]
Brandt

[11] 3,960,731
[45] June 1, 1976

[54] SELF CLEANING SCREEN ASSEMBLY

[76] Inventor: Louis K. Brandt, 6300 Milvale, Houston, Tex. 77017

[22] Filed: Nov. 29, 1974

[21] Appl. No.: 528,463

[52] U.S. Cl. ................................ 210/332; 210/353; 210/385; 210/413; 210/DIG. 18; 209/323
[51] Int. Cl.[2] ...................... B07B 1/48; B01D 29/04
[58] Field of Search .............. 55/293, 300; 209/323, 209/325, 381, 382, 385, 387; 210/332, 353, 413, DIG. 18, DIG. 22, 384, 385, 388

[56] References Cited

UNITED STATES PATENTS

| | | | |
|---|---|---|---|
| 699,026 | 4/1902 | Shaler | 209/387 |
| 979,685 | 12/1910 | Mumford | 209/385 X |
| 1,925,447 | 9/1933 | Keefer | 209/323 |
| 2,304,325 | 12/1942 | Williams et al. | 209/382 X |
| 3,508,649 | 4/1970 | Kahane et al. | 209/385 X |
| 3,748,835 | 7/1973 | Panzica | 210/413 X |
| 3,841,482 | 10/1974 | Barrows et al. | 209/382 X |
| R26,736 | 12/1969 | Swallow | 209/385 X |

*Primary Examiner*—Thomas G. Wyse
*Assistant Examiner*—Robert H. Spitzer

[57] ABSTRACT

A self cleaning screen assembly according to the present invention is adapted for utilization in conjunction with an oscillating mechanical separator incorporating a screen framework having a screen and a perforated support plate connected thereto and disposed in spaced relation. The screen is defined by a wire mesh and accomplishes the primary screening function while the support plate is defined by a perforated metal plate which serves a supporting function for a plurality of screen cleaning devices that are disposed in the space between the screen and plate. The height of each of the screen cleaning devices is slightly less than the spacing of the screen and plate while the width thereof exceeds the spacing of the screen and plate, allowing the screen cleaning devices to be movable relative to the screen and while preventing them from becoming misoriented due to oscillation of the mechanical separator. A scraper blade means is carried by each of the screen cleaning devices. The upper portions of the scraper blades are disposed above the upper portion of the screen cleaning devices for scraping engagement with the lower surface of the screen as the mechanical separator oscillates the screen assembly. The scraping action removes any material that might be clinging to the upper screen. The separator includes a generally horizontally disposed screen oscillating shaft having eccentric weights connected thereto, the rotary shaft being disposed in generally parallel relation to the plane defined by the screen, thereby causing the rotary shaft to impart generally vertical orbital oscillation to the screen assembly.

18 Claims, 14 Drawing Figures

FIG.1
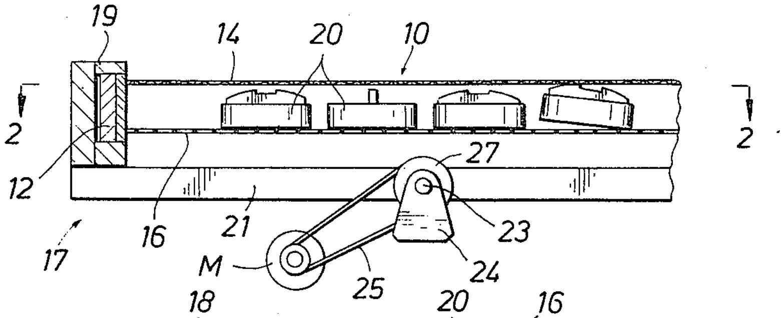
FIG.2
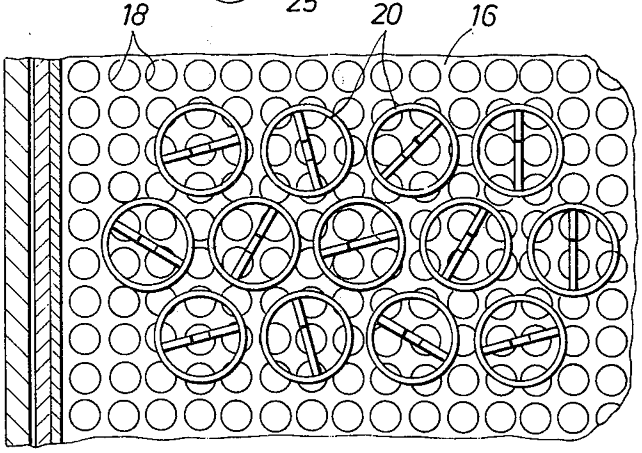
FIG.3
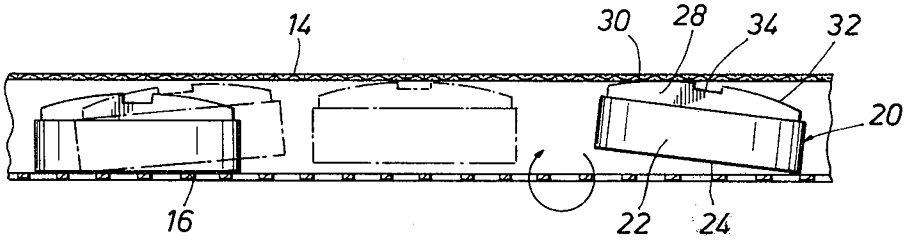
FIG.4
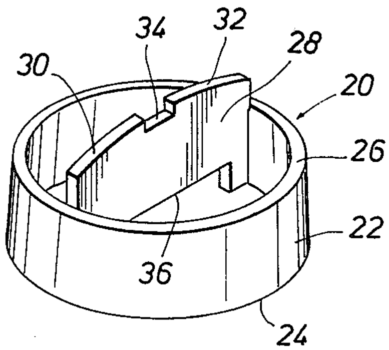
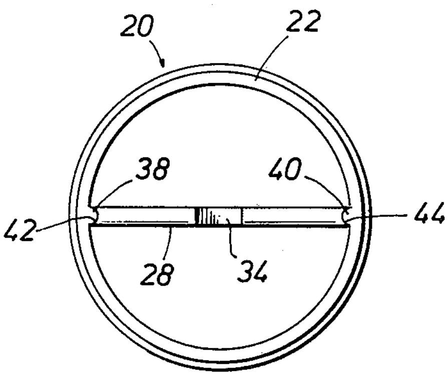
FIG.5

FIG. 6
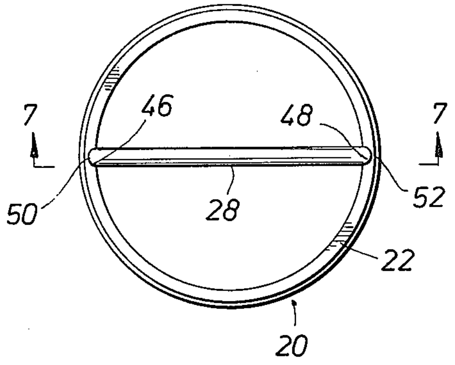
FIG. 7
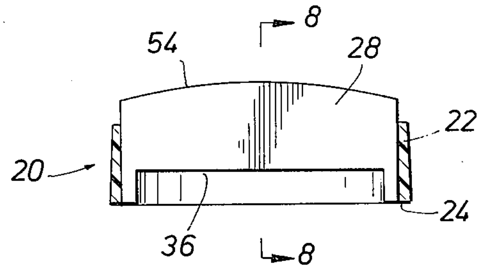
FIG. 8
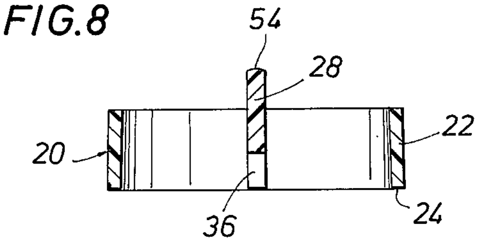
FIG. 9
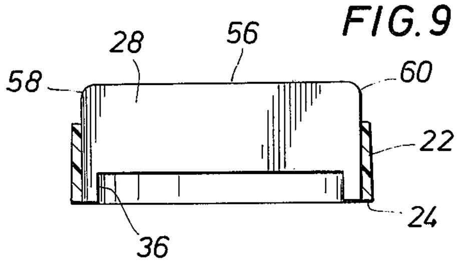
FIG. 10
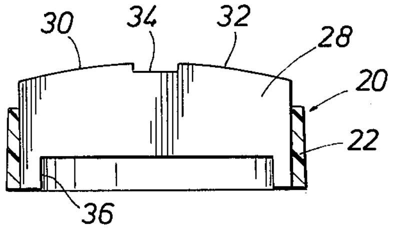
FIG. 11
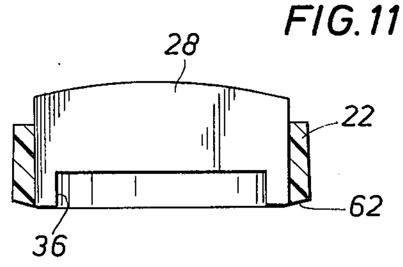
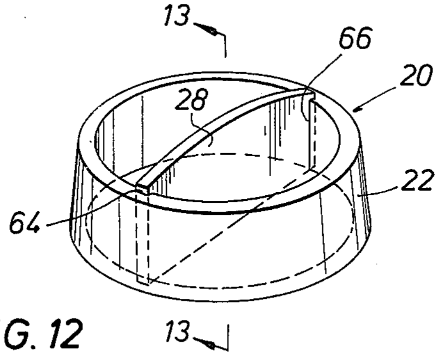
FIG. 12
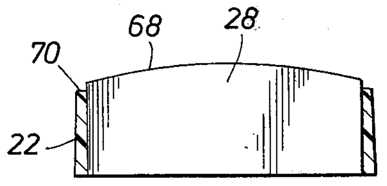
FIG. 13
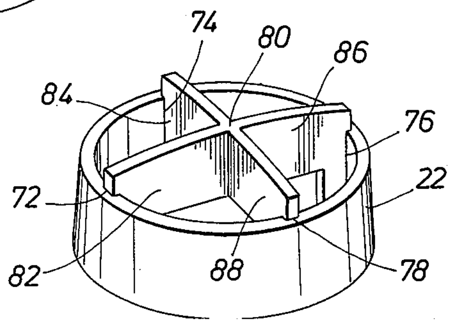
FIG. 14

SELF CLEANING SCREEN ASSEMBLY

FIELD OF THE INVENTION

This invention relates generally to oscillatory separator mechanisms that are employed for separating materials as the materials pass through a screen assembly. The invention contemplates separation of solid materials from liquid as well as from other solid materials. More specifically, however, the present invention relates to utilization of a screen assembly for oscillating separator mechanisms wherein a plurality of screen cleaning devices are employed, each of the screen cleaning devices having one or more scraper blades for removing from the screen any material that might be clinging thereto or lodged therein so that the upper screen will not become blocked by an accumulation of material such.

BACKGROUND OF THE INVENTION

Oscillatory and vibratory type mechanical separators have been commercially available for an extensive period of time for the purpose of separating solid materials and separating solid materials from liquid materials. One of the problems that arises is screen blockage, especially where solid materials are separated from liquid materials, such as in separation of drilling cuttings from the drilling mud that is utilized during the process of drilling oil wells. It has been determined that oscillatory and vibratory screens frequently become blocked by materials that are carried along with the drilling mud or other material. In fact, the liquid material passing through the screens often includes a small quantity of granular material and especially those liquids including various chemical and natural constituents, may have a certain degree of stringyness causing a considerable amount of the liquid or semi-solid slurry material to cling to the underside of the screen. When this occurs, the clinging material actually blocks at least a portion of the mesh of the screen and thereby substantially reduces the effectiveness of the screening operation. It is possible for the mesh openings of a typical drilling mud screen to become reduced in the order of 50 to 75 percent within a very short period of time. When this occurs, the commercial effectiveness of the screening or separating operation is severely reduced, thereby adding to the overall cost of the commercial operation with which it is associated. It is therefore desirable to provide means for cleaning the underside of the screen that accomplishes the primary screening function in order that the screen mesh openings will remain unblocked.

THE PRIOR ART

Screen cleaning mechanisms for reciprocatory vibratory and oscillatory screen mechanisms are well known in the art as identified by U.S. Pat. No. 979,685 Mumford and No. 1,925,447 Keefer which both depict a plurality of movable screen cleaning devices disposed between spaced screens and which have a sliding relation with the screens as taught by Mumford or an impacting relation therewith as taught by Keefer. Other screen cleaning devices have been developed as identified in U.S. Pat. No. 961,414 Kinsey and No. 1,572,112 Forgeson. U.S. Pat. No. Re. 26,736 to Swallow also depicts a screen cleaning structure that incorporates a plurality of cleaning devices disposed between the screens and which, responsive to rotary oscillation of the screen structure by eccentric weights rotated about a vertical axis, cause the cleaning elements to precess in a circular path about the separating screen causing the flat ends thereof to move laterally as well as vertically against the separating screen for the shearing of any material that might be clinging thereto.

It has been determined that excessive screen wear results when cleaning elements, disposed within a screen assembly, are caused to impact against the underside of the upper screen when the cleaning devices are of substantially tubular configuration defining rather sharp circular edges. Short life of screen assemblies, requiring frequent replacement or repair thereof is undesirable and adversely effects the commercial aspects of drilling or other commercial separating operations. It is therefore a primary object of the present invention to provide a self cleaning screen assembly for oscillating mechanical separators wherein the screen assembly incorporates cleaning devices that react against the lower surface of the upper screen in such manner that screen wear occurs at a nominal rate.

It is a further object of the present invention to provide a self cleaning screen assembly for oscillating mechanical separators wherein cleaning devices are employed that have elongated substantially linear scraping surfaces that serve to shear or wipe away material clinging to the upper screen of the screen assembly.

It is an even further object of the present invention to provide a novel self cleaning screen assembly incorporating screen cleaning devices having a plurality of linear scraper surfaces that react against the upper screen in such a manner that effective cleaning occurs without accelerated screen wear.

Among the several objects of the present invention is noted the contemplation of a novel self cleaning screen assembly incorporating screen cleaning devices that are urged to move in generally vertically oriented circles or ellipses to achieve wiping movement with the upper screen structure by causing oscillatory movement of the screen assembly about a generally horizontally disposed axis.

It is also an important object of the present invention to provide a novel mechanical separator mechanism wherein a material screening assembly is disposed in generally horizontal position defining a generally horizontal plane and a screen oscillating shaft is disposed in generally parallel relation with the plane and is operatively connected to the material screening assembly with eccentric weight means connected to the shaft and acting through the rotary shaft to impart oscillatory movement to the screen assembly.

Other and further objects, advantages and features of the invention will become obvious to one skilled in the art upon an understanding of the illustrative embodiment about to be described and various advantages, not referred to herein, will occur to one skilled in the art upon employment of the invention in practice.

SUMMARY OF THE INVENTION

The present invention is directed to the provision of a self cleaning screen assembly which is utilized in conjunction with oscillating separator apparatus which subjects the screen assembly to rotary motion about an axis that is disposed in substantially parallel relationship with the plane established by the screen assembly. The screen assembly will typically take the form of a framework retaining a screen and support plate in spaced and generally parallel oriented relation. The screen is typically defined by a wire mesh and serves a primary screening function while the support plate may take the form of a perforated plate providing support for a plurality of screen cleaning elements that are loosely disposed therebetween. Each of the screen cleaning elements may include a body portion in the form of a cylindrical element having a circular flat bottom surface that normally rests upon the support plate of the screen assembly.

The upper portion of the screen cleaning elements may be defined by scraping blade means that extends transversely across the upper generally circular portion of the cylindrical body, which blade extends above the upper end of the cylindrical body and is disposed for scraping contact with the lower surface of the screen member. The upper surface of the scraper blade may be essentially straight or curved as desired, depending upon the character of the material that is being separated and the scraping function desired. The scraper blades may be formed integrally with the cylindrical body portions by molding or the like or, in the alternative, the scraper blades may be separate elements that are secured to the cylindrical body elements in any desirable manner.

The blade supporting scraping elements and the screen assembly is designed specifically for utilization with oscillatory separator apparatus which obtains oscillatory vibration or oscillation through rotation of a shaft having one or more eccentric weights connected thereto. The vibration inducing shaft is disposed in essentially parallel relationship with the plane or planes established by the screens, thereby causing oscillatory motion induced to the screen structure to be orbital vertically about the horizontal axis.

BRIEF DESCRIPTION OF THE DRAWINGS

In order that the manner in which the above-recited advantages and objects of the invention are attained, as well as others, which will become apparent, can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of the invention and therefore are not to be considered limiting of its scope, for the invention may admit to other equally effective embodiments.

In the Drawings:

FIG. 1 is a fragmentary sectional view of a screen assembly and oscillating separator mechanism constructed in accordance with the present invention and depicting a plurality of screen cleaning elements disposed between the upper and lower screens thereof.

FIG. 2 is a sectional view taken along line 2—2 in FIG. 1 and illustrating a part of the screen framework and cleaning element support screen in plan with a plurality of screen cleaning elements disposed thereon.

FIG. 3 is a fragmentary sectional view similar to the view depicted in FIG. 1 and illustrating various positions of the movable screen cleaning elements during oscillation of the screen cleaning assembly.

FIG. 4 is an isometric view of a screen cleaning element constructed in accordance with the present invention.

FIG. 5 is a plan view of a screen cleaning element representing a modified embodiment of the present invention.

FIG. 6 is a plan view of a screen cleaning element representing a further modified embodiment of the present invention.

FIG. 7 is a sectional view taken along line 7—7 of FIG. 6.

FIG. 8 is a sectional view taken along line 8—8 of FIG. 7.

FIG. 9 is a sectional view similar to that illustrated in FIG. 7 and representing a modified embodiment of the present invention.

FIG. 10 is a sectional view similar to the sectional view of FIG. 7 and representing a further modified embodiment of the present invention.

FIG. 11 is a sectional view similar to that shown in FIG. 7 and representing an additional embodiment of the present invention.

FIG. 12 is an isometric view illustrating a screen cleaning element representing a further modified embodiment of the present invention.

FIG. 13 is a sectional view taken along line 13—13 of FIG. 12.

FIG. 14 is an isometric view representing a screen cleaning element which is a further modified embodiment of the present invention.

DESCRIPTION OF PREFERRED EMBODIMENTS

Referring now to the drawings and first to FIG. 1, there is shown a screen assembly generally at 10 which in the fragmentary view shown in FIG. 1 includes a structural framework 12 having a screen element 14 and a support plate 16 secured thereto with the screen and support plate being disposed in generally parallel spaced relation. The screen 14 may be defined by a wire mesh and serves a primary separating function to separate materials deposited thereon.

It is typical, in the separation of solid drill cuttings from drilling mud utilized in conjunction with the drilling of oil wells, to deposit the drilling mud exiting from the well onto a screen assembly and to cause the screen assembly to vibrate in such manner that the drilling cuttings are transported vibratorily and caused to exit transversely from the screen assembly while the drilling mud flows through the screen assembly and is processed for recirculation through the drill stem for further drilling operations.

The support plate 16 of the screen assembly may conveniently take the form of a perforated support sheet or plate which may be constructed of metal or any other suitable material having sufficient structural integrity. The support plate 16 may have a plurality of perforations 18 formed therein in order to allow the liquid or fine granular component passing through the screen to pass through the support plate without any degree of interference. The support plate must therefore be provided with a sufficient number of perforations of sufficient dimension in order to allow as much liquid material or fine granular material to flow therethrough as will freely pass through the screen.

As is explained above, it is typical when separating some materials and especially when separating drilling cuttings from drilling mud that screen blockage will occur due to accumulation of material in string-like form on the bottom of the screen. It is desirable therefore to provide means for cleaning any accumulation of material from the lower surface of the screen and, according to the present invention, such means may conveniently take the form of a plurality of cleaning elements shown generally at 20 which rest upon the perforated support plate with the upper screen scraping or wiping portion thereof normally disposed in spaced relation with the bottom surface of the screen. Screen retaining structure, illustrated generally at 17, may be provided on the material separator apparatus having clamp means 19 which retains the screen framework 12. A horizontal portion 21 of the screen retaining structure may support the clamp structure 19 and may receive the transverse rotary shaft 23 of the separator apparatus. Power apparatus of any suitable conventional nature, such as an electric motor M operating through a belt 25 and pulley system 27 may be employed to impart rotation to the shaft 23. During operation of the separator apparatus the screen assembly 10 is oscillated by revolving eccentric weights 24 that are connected to shaft 23, which is disposed in generally parallel relation with the plane established by the screen assembly.

The rotating and vibrating oscillatory shaft which may be connected in any other suitable manner to the framework 12, supporting the screen and the perforated support plate, will cause the screen assembly to oscillate in the manner shown by the partially circular arrow in FIG. 3, and the cleaning elements to move in the manner shown in FIG. 3. During a portion of the oscillatory motion, the cleaning elements will be disposed in the position illustrated in full line at the left hand portion of FIG. 3, with the bottom surface thereof in contact with the support plate 16. During another portion of the oscillatory movement, the cleaning elements will assume a position illustrated in broken line at the left hand portion of FIG. 3, with a portion of the upper scraping blade thereof in contact with the lower surface of the screen and with the vertical axis of the cleaning element slightly angulated with respect to its position shown in broken line. Simultaneously, transverse movement is imparted to the cleaning element causing it to shift laterally with respect to the screen and support plate, accomplishing a wiping or scraping action during such movement. As the oscillatory movement continues, as shown in broken line in the center portion of FIG. 3, the upper scraping blade portion of the cleaning elements will be disposed in contact with the lower surface of the screen with the vertical axis thereof disposed essentially vertically or in generally parallel relation with the position of the vertical axis shown at the left hand portion of FIG. 3 in full line. As the revolving movement continues further, the cleaning elements will essentially rotate partially in the space between the screen and the support plate essentially as shown at full line at the right hand portion of FIG. 3 where the blade portion of the cleaning elements is disposed in scraping or wiping contact with the lower surface of the screen and with the vertical axis thereof slightly angulated with respect to the vertical. The cleaning elements will traverse laterally during portions of the oscillatory movement thereby causing the scraping blade portions of the cleaning elements to have a scraping or wiping action with the screen, thereby accomplishing removal of accumulated material from the lower surface of the screen. The screen will therefore remain clear and material of proper dimension will flow freely therethrough.

Although the cleaning elements 20 may take many different forms without departing from the spirit and scope of the present invention, a preferred embodiment is illustrated in FIG. 4 where the cleaning element is shown generally at 20 having a generally cylindrical or slightly frusto-conical body 22 defining a generally circular base surface 24 and a generally circular upper surface 26. In the event the cleaning element 20 is molded or the body portion thereof is molded, it may be frusto-conical only to the extent that sufficient draft is provided for the molding operation. For the purpose of clearing the underside of the screen 14 of any accumulation of material thereon which might reduce the effectiveness of the screen, each of the cleaning elements may be provided with scraper or wiper means that accomplishes removal of material adhereing to the underside of the screen. It is desirable that the scraper or wiper means have a blade like configuration for accomplishing the wiping function. In accordance with the present invention a scraper or wiper means may conveniently take the form illustrated in FIG. 4 where a scraper blade 28 is shown to be connected at each extremity thereof to the generally cylindrical body portion 22. If desired, the scraper blade 28 may be formed integrally with the generally cylindrical or slightly tapered body portion 22 or, depending upon the desired type of manufacture, may be in the form of a separate element that is secured at each extremity thereof to the body portion 22 by any desirable means of retention. Both the body portion 22 and the scraper blade element 28 may be composed of any suitable wear resistant material, such as metal or any one of a suitable number of plastic materials, within the spirit and scope of the present invention. It is desirable, however, that the body portion 22 and blade element be of lightweight construction in order to prevent excessive wear of the screen and support plate during operation of the separator mechanism. It has been determined that screen cleaning elements composed entirely of plastic material such as polyvinylchloride will function quite efficiently without creating excessive wear of the screen or support plate.

It is desirable that the scraper blade 28 have a scraper surface that extends above the upper annular surface 26 of the cleaning element and, according to the present invention scraper surfaces 30 and 32 may be defined by a centrally located recess 34 formed in the blade. It has been determined that division of the upper scraping surface of the blade into opposed scraper surfaces or, in effect removing the center portion of the scraping surface has the effect of limiting the degree of wear that occurs during scraping action between the scraper blades and the screen. The upper scraping surfaces 30 and 32 of the scraper blade 28 may be straight or curved as desired. It has been found, however, that the oscillatory motion which is employed will cause the upper scraper surfaces of the scraper blades to be worn to an arcuate configuration and therefore it is considered practical that provision of scraper blades of arcuate configuration be provided to reduce the degree of scraper blade wear and render the scraper blades more effective in use.

For the purpose of reducing the overall weight of the cleaning elements, the scraper blades 28 may be provided with lower recesses 36 which also have the function of providing clearance between the scraper blades and the support plate which prevents interference with flow of material through the perforations of the support plate.

As illustrated in FIG. 5, one suitable means for establishing connection between the scraper blade 28 and the angular body portion 22 may conveniently take the form of opposed generally vertically and parallel oriented beads 38 and 40 that are formed by any suitable means on the interior wall structure of the body 22. The blade element 28 may be provided with arcuate recesses 42 and 44 respectively that are received by the parallel beads 38 and 40 to provide an interlocking relationship between the scraper blade and the body 22. If desired, an adhesive material of any suitable form may be placed at the points of connection between the scraper blade and the annular body 22 to render the combined body and scraper blade into essentially integral form.

With regard now to FIGS. 6 and 7, it may be desirable to form generally parallel grooves 46 and 48 in the annular body 22 which define opposed receiving recesses for arcuately curved extremities 50 and 52 of the scraper blade 28, thereby providing interlocking relationship between the scraper blade and the annular body. Again, the scraper blade 28 may be simply received in close fitting engagement within the grooves 46 and 48 or, in the alternative, any suitable adhesive material may be employed to retain the scraper blade and annular body in essentially integral assembly. As shown in FIG. 7, the scraper blade 28 may be provided with a single arcuate upper scraping or wiping surface 54 that achieves wiping engagement with the underside of the screen. The surface 54 may be arcuate when viewed transversely as shown in FIG. 8, depending upon the wiping or scraping characteristics that are desired.

With reference now to FIG. 8, a modified embodiment of the present invention is illustrated, wherein the scraper blade 28 is provided with an essentially flat scraping surface 56 having rounded corners 58 and 60. The flat scraping or wiping surface 56 will accomplish efficient removal of material clinging to the underside of the screen and rounded corners 58 and 60 will prevent excessive screen wear when the cleaning element is oriented with its axis other than vertical.

FIG. 11 depicts a modified embodiment of the present invention wherein the annular body 22 is provided with a tapered support surface 62 that serves to limit the degree of wear that will occur on the support plate as the cleaning elements are oriented in positions with the axis thereof other than vertical. The scraper blade 28, in all respects, may be substantially identical to that shown in FIG. 7 or in the other figures of the drawings without departing from the spirit and scope of the present invention.

With reference now to FIGS. 12 and 13, cleaning elements 30 may conveniently take the form of an annular body portion 22 that may be slightly tapered or cylindrical depending upon the characteristics of manufacture thereof and which body portion may be provided with opposed generally vertically oriented slots 64 and 66 that are disposed in essentially parallel relation and receive opposed extremities of a scraper blade 28 that extends through the vertical axis of the annular body. As shown in FIG. 13, the scraper blade 28 may conveniently take the form of a simple planar element having an upper scraping surface 68 that extends above the upper extremity 70 of the body 22. The scraping surface 68 may be arcuate as shown or, in the alternative, it may be essentially flat as depicted in FIG. 9.

While scraper blade structures are typically employed having a single blade element, it is not intended to limit the present invention to utilization of single scraper blades, it being obvious that plural blades may also be employed by each scraper element. As shown in FIG. 14, a plural blade scraper element may be employed which comprises an annular body 22 which may take the essential form of the annular bodies depicted in FIGS. 1–13. As shown in FIG. 14, the annular body 22 may be provided with four generally vertically oriented slots 72, 74, 76 and 78 which receive the extremities of a multiple bladed scraping or wiping element 80 shown to have four blades 82, 84, 86 and 88, respectively, which may be integrally formed or may be assembled into essentially cruciform configuration. The upper scraping surfaces of each of the scraper or wiper blades may be arcuate configuration or flat, depending upon the characteristics of the cleaning operation that is desired. Also, the lower portions of the blades may be recessed as shown in FIG. 14 to provide for reduction in the overall weight of the cleaning elements and to prevent interference with the flow of material through the perforations of the support plate.

As the separator apparatus is operated, the screen assembly including the screen 14, the support plate 16, the frame 12 and the cleaning elements 20 will be caused to oscillate quite rapidly, the oscillatory movement being about an axis that is generally horizontal and is in essentially parallel relationship with the plate of the screen and support plate. The oscillatory movement of the screen assembly is essentially circular with components of movement being vertically circular, which causes the cleaning elements to have completely circular components of movement, the circular effect thereof being limited solely by contact thereof with the support plate 16 and with the underside of the screen 14. This movement causes the cleaning elements to move about in random manner relative to the screen and support plate and to individually take on movement which is vertical and horizontal as well as movement that causes the axes of the cleaning elements to be disposed in angular relationship during portions of the compound movement that occurs. The cleaning elements may precess in unison about the area of the support plate and screen or, depending upon the character of material and the flexibility of the support plate and screen, the cleaning elements may take on random character of movement. In any case, the result is that the cleaning elements are caused to move at times with the scraping blades thereof in scraping contact with the underside of the screen, thereby causing any material accumulated on the underside of the screen to be wiped away where it will then descend through the perforations of the support plate into an appropriate receiver. The wiping relationship between the scraper blades of the cleaning elements and the underside of the screen will maintain the screen clear of any blocking accumulation of material and will promote efficiency of the screening operation that is being conducted.

It is therefore apparent that the present invention is one well adapted to attain all of the objects and advantages hereinabove set forth, together with other advantages which will become obvious and inherent from a description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. An orbital oscillating separator mechanism having screen support means and means for imparting orbital oscillation to said screen support means, said screen support means retaining a self cleaning screen assembly, said screen assembly comprising:

a screen framework;

a separator screen being secured at the periphery thereof to said screen framework;

a support element being secured at the periphery thereof to said screen framework and being disposed in spaced generally parallel relation to said screen, said support element being formed to define a plurality of openings for passage of material therethrough;

a plurality of screen cleaning devices being disposed in the space between said upper and lower screens, each of said screen cleaning devices having a body portion, the height of said body portion being less than the spacing of said screen and support plate and the width of said body portion being greater than the spacing of said screen and support plate; and scraper blade means being connected to said body portion of said screen cleaning device with the upper portion of said scraper blade means being disposed above the upper portion of said body portion, said scraper blade means defining at least one elongated scraping surface for scraping engagement with the lower surface of said screen as said mechanical separator is operated with a scraping action that removes material from the underside of said screen.

2. An oscillating separator mechanism as recited in claim 1, wherein:

said body portion of each of said screen cleaning devices is of generally circular external configuration and said scraper blade of each of said screen cleaning devices is defined by at least one elongated scraper bar that extends transversely across said generally circular body.

3. An oscillating separator mechanism as recited in claim 2, wherein:

said scraper blade is of curved upper configuration, the highest point thereof being located at least near the center of said scraper bar.

4. An oscillating separator mechanism as recited in claim 1, wherein:

said body portion of each of said screen cleaning devices is of generally cylindrical ring-like configuration and said scraper blade of each of said screen cleaning devices is defined by an elongated scraper bar that is connected at each extremity thereof to said body; and an elongated scraper surface being defined by the upper portion of said scraper bar and contacting the underside of said screen with a scraping action during a portion of each orbital oscillation of said screen framework.

5. An oscillating separator mechanism as recited in claim 1, wherein:

the upper portion of said scraper blade means is formed to define a groove located at least near the center thereof separating the upper portion of said blade means into a pair of spaced elongated screen contacting surfaces.

6. An oscillating separator mechanism as recited in claim 1, wherein:

an upper scraping surface is defined on said scraper blade means and is of elongated generally planar configuration.

7. An oscillating separator mechanism as recited in claim 1, wherein said scraper blade means comprises:

a plurality of elongated scraper blade elements being carried by each of said screen cleaning devices, said scraper blade elements being disposed in intersecting relation and presenting a plurality of elongated scraping surfaces each positioned above said body portion for engagement with said screen.

8. An oscillating separator mechanism as recited in claim 1, wherein screen oscillating means is provided for imparting oscillating movement to said screen assembly, said screen oscillating means comprising:

means for supporting said screen assembly; and means for imparting orbital movement to said support means, said orbital movement being established about an axis that is disposed in generally horizontal relation to a plane established by said upper screen.

9. An oscillating separator mechanism as recited in claim 8, wherein said means for imparting orbital movement to said screen assembly comprises:

at least one rotatable shaft being disposed in generally parallel relation to said screen; and means establishing connection between said screen framework and said shaft and causing oscillatory vibration of said shaft to be transmitted to said screen framework.

10. An oscillating separator mechanism as recited in claim 1, wherein:

said scraper blade means comprises:

an elongated blade element extending across and intersecting the vertical axis of said body portion of said screen cleaning device, said scraper blade extending above the body portion of said screen cleaning device; and the upper portion of said scraper blade being formed to define a generally centrally located groove separating the upper portion of said scraper blade into a pair of screen contacting surfaces.

11. An oscillating separator mechanism as recited in claim 10, wherein:

each of said screen contacting surfaces is of curved configuration, curving downwardly from high points near the center of said blade element to low points at the extremities of said blade element.

12. An oscillating mechanical separator apparatus comprising:

screen framework means establishing a generally horizontal plane;

rotary shaft means being disposed in generally parallel relation with said plane and being rotatably interconnected with said screen framework;

eccentric weight means being connected to said rotary shaft and imparting orbital oscillatory movement to said shaft and screen framework during rotary movement of said shaft;

means for imparting rotary movement to said shaft;

a separator screen being secured at the periphery thereof to said screen framework;

a support element being secured at the periphery thereof to said screen framework and being disposed in spaced generally parallel relation to said screen, said support element defining openings through which material may pass;

a plurality of screen cleaning devices being disposed in the space between said screen and support element, said screen cleaning devices including a body portion, the height of said screen cleaning devices being less than the spacing of said screen and support element and the width of said screen cleaning devices being greater than the spacing of said screen and support element; and scraper blade means being carried by said body portion of each of said screen cleaning devices with the upper portion of said scraper blade means being disposed above the upper portion of said body portion, said scraper blade means defining at least one elongated knife-like scraping surface for knife-like scraping engagement with the lower surface of said screen as said mechanical separator is operated with a scraping action that removes any material clinging to the underside of said screen.

13. An oscillating mechanical separator apparatus as recited in claim 12, wherein:

each of said screen cleaning devices includes a body portion of generally circular external configuration and said scraper blade of each of said screen cleaning devices is defined by an elongated scraper blade that extends transversely across said generally circular body, said scraper bar having a portion thereof extending above said body portion and defining said elongated scraping surface.

14. An oscillating mechanical separator apparatus as recited in claim 12, wherein:

each of said screen cleaning devices is defined by a body of ring-like configuration and said scraper blade of each of said screen cleaning devices is defined by an elongated scraper bar that is connected at each extremity thereof to said body, the upper portion of said scraper bar extending above said body and defining a scraper surface for engagement with the lower surface of said screen.

15. A screen cleaning device for removing material accumulating on the underside of a screen utilized for separating materials, said screen cleaning device comprising:

a body portion having upper, lower and side surfaces defined thereby, said lower surface being generally flat and being adapted to be received in sliding supported relationship with a generally planar support element;

at least one elongated scraper blade element being provided on said body portion, said scraper blade element extending transversely across said body portion and having at least a portion thereof extending above said body portion; and an elongated scraper surface being defined at the upper portion of said elongated scraper blade element and being disposed for engagement with the under side of a screen disposed in close proximity to said support element.

16. A screen cleaning device as recited in claim 15, wherein:

said body portion is of ring-like configuration defining an inner surface of said body; and said scraper blade element is connected at each extremity thereof to said inner surface of said body.

17. A screen cleaning device as recited in claim 15, wherein:

said scraper surface means is of arcuate configuration.

18. A screen cleaning device as recited in claim 15, wherein:

said scraper blade means is formed to define generally centrally located recess means, said recess means dividing said scraper surface means into a pair of spaced elongated scraper surfaces.

* * * * *